(12) United States Patent
Cao et al.

(10) Patent No.: US 10,706,355 B2
(45) Date of Patent: Jul. 7, 2020

(54) METHOD AND SYSTEM FOR DISTRIBUTED CODING AND LEARNING IN NEUROMORPHIC NETWORKS FOR PATTERN RECOGNITION

(71) Applicant: HRL Laboratories, LLC, Malibu, CA (US)

(72) Inventors: Yongqiang Cao, Newton, MA (US); Praveen K. Pilly, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/199,054

(22) Filed: Nov. 23, 2018

(65) Prior Publication Data

US 2019/0228300 A1 Jul. 25, 2019

Related U.S. Application Data

(60) Provisional application No. 62/621,012, filed on Jan. 23, 2018.

(51) Int. Cl.
| | |
|---|---|
| *G06N 3/08* | (2006.01) |
| *G06N 3/06* | (2006.01) |
| *G06K 9/62* | (2006.01) |
| *G06K 9/00* | (2006.01) |

(Continued)

(52) U.S. Cl.
CPC ........... *G06N 3/08* (2013.01); *G06K 9/00536* (2013.01); *G06K 9/00986* (2013.01); *G06K 9/6256* (2013.01); *G06K 9/6269* (2013.01); *G06K 9/6274* (2013.01); *G06N 3/063* (2013.01); *G06N 20/00* (2019.01); *G06K 2209/01* (2013.01)

(58) Field of Classification Search
CPC ................................ G06N 3/063; G06N 3/08
See application file for complete search history.

(56) References Cited

U.S. PATENT DOCUMENTS

| | | | | |
|---|---|---|---|---|
| 2009/0287624 | A1* | 11/2009 | Rouat ................ | G06K 9/4623 706/20 |
| 2016/0260429 | A1* | 9/2016 | Jin ..................... | G10L 15/08 |
| 2017/0286828 | A1* | 10/2017 | Smith ................. | G06N 3/049 |

(Continued)

OTHER PUBLICATIONS

Anwani, Navin, and Bipin Rajendran. "NormAD-normalized approximate descent based supervised learning rule for spiking neurons." 2015 international joint conference on neural networks (IJCNN). IEEE, 2015. (Year: 2015).*

(Continued)

*Primary Examiner* — Hal Schnee
(74) *Attorney, Agent, or Firm* — Tope-McKay & Associates

(57) ABSTRACT

Described is a system for pattern recognition designed for neuromorphic hardware. The system generates a spike train of neuron spikes for training patterns with each excitatory neuron in an excitatory layer, where each training pattern belongs to a pattern class. A spiking rate distribution of excitatory neurons is generated for each pattern class. Each spiking rate distribution of excitatory neurons is normalized, and a class template is generated for each pattern class from the normalized spiking rate distributions. An unlabeled input pattern is classified using the class templates. A mechanical component of an autonomous device can be controlled based on classification of the unlabeled input pattern.

21 Claims, 8 Drawing Sheets

(51) Int. Cl.
*G06N 3/063* (2006.01)
*G06N 20/00* (2019.01)

(56) References Cited

U.S. PATENT DOCUMENTS

2018/0075345 A1* 3/2018 Gottfried ............... G06N 3/049
2018/0276530 A1* 9/2018 Paul ....................... G06N 3/049
2019/0108434 A1* 4/2019 Wozniak ............... G06N 3/0635

OTHER PUBLICATIONS

P.U. Diehl and M. Cook (2015). Unsupervised learning of digit recognition using spike-timing-dependent plasticity. Frontiers in Computational Neuroscience, 9, pp. 1-9.

Y. LeCun, C. Cortes and C. Burges [online]. MNIST handwritten digit database, http://yann.lecun.com/exdb/mnist/, taken on Feb. 13, 2019, pp. 1-9.

Notification of Transmittal of International Search Report and the Written Opinion of the International Searching Authority for PCT/US2018/062398; dated Mar. 21, 2019.

International Search Report of the International Searching Authority for PCT/US2018/062398; dated Mar. 21, 2019.

Written Opinion of the International Searching Authority for PCT/US2018/062398; dated Mar. 21, 2019.

Banafshen Rekabdar, 'Learning, Recognizing and Early Classification of Spatio-Temporal Patterns using Spike Timing Neural Networks', University of Nevada, Reno, May 2017.

Christoph Krautz, 'On Principles of Cortical computation', ETH zurich Research Collection, DISS ETH No. 20207, 2012.

Elisabetta Chicca, et al., 'Neuromorphic Electronic Circuits for Building Autonomous Cognitive System', Proceedings of IEEE, vol. 102, Issue 9, Sep. 2014.

Taras Lakymchuk et al., 'Simplified spiking neural network architecture and STDP learning algorithm applied to image classification', EURASIP Journal on Image and Video Processing, Sep. 19, 2015.

Horn, R. A. and Johnson, C. R. "Norms for Vectors and Matrices." Ch. 5, p. 320, in Matrix Analysis. 2nd Edition, Cambridge, England: Cambridge University Press, 1990.

Y. LeCun, L. Bottou, Y. Bengio, and P. Haffner. (1998).Gradient-based learning applied to document recognition. Proceedings of the IEEE, 86(11): pp. 2278-2324.

* cited by examiner

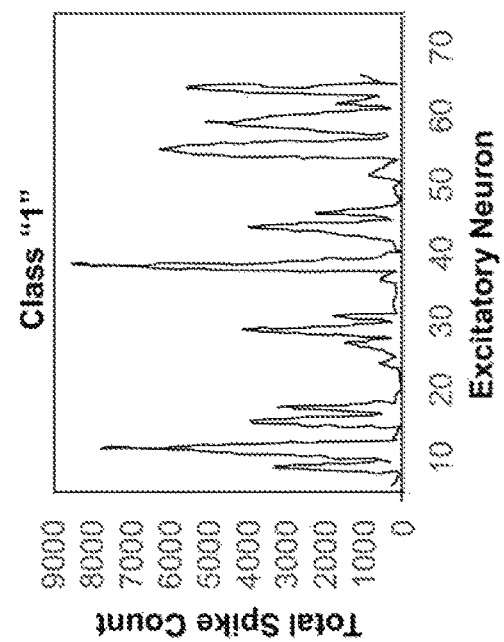
FIG. 4A Class "0"
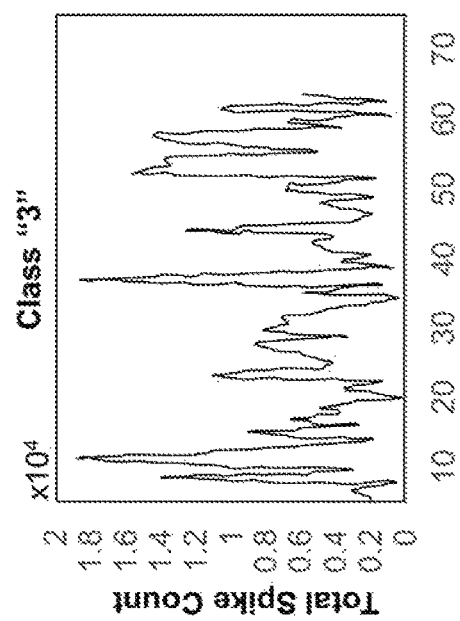
FIG. 4B Class "1"
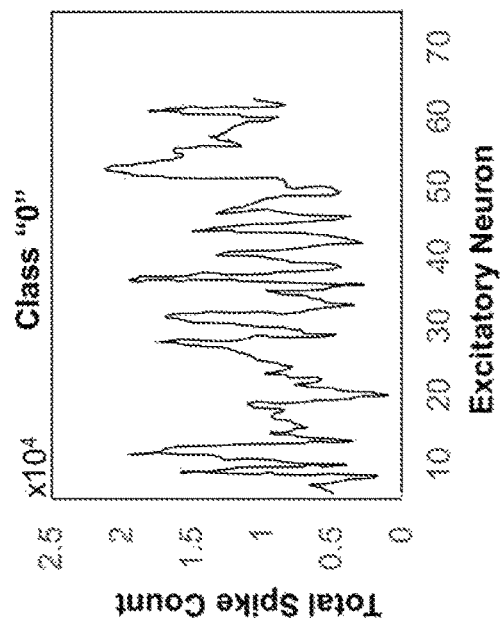
FIG. 4C Class "2"
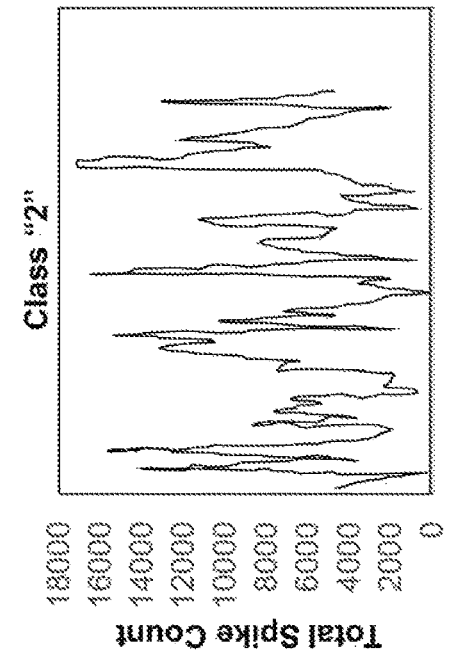
FIG. 4D Class "3"

METHOD AND SYSTEM FOR DISTRIBUTED CODING AND LEARNING IN NEUROMORPHIC NETWORKS FOR PATTERN RECOGNITION

CROSS-REFERENCE TO RELATED APPLICATIONS

This is a Non-Provisional Application of U.S. Provisional Application No. 62/621,012, filed in the United States on Jan. 23, 2018, entitled, "A Method and System for Distributed Coding and Learning in Neuromorphic Networks for Pattern Recognition," the entirety of which is incorporated herein by reference.

BACKGROUND OF INVENTION

(1) Field of Invention

The present invention relates to a system for pattern recognition and, more particularly, to a system for pattern recognition that applied a structured network to neuromorphic hardware.

(2) Description of Related Art

In machine learning, pattern recognition focuses on recognition of patterns and regularities in data. Pattern recognition is commonly used for image processing, medical diagnostics, vehicle navigation and guidance systems, and identification/authentication for security purposes (e.g., fingerprint comparisons).

In "Unsupervised Learning of Digit Recognition Using Spike-Timing-Dependent Plasticity," Frontiers in Computational Neuroscience, 9, 2015 (which is hereby incorporated by reference as though fully set forth herein), Diehl and Cook describe performing unsupervised pattern recognition using spike-timing-dependent plasticity (STDP). The spiking neural network disclosed by Diehl and Cook cannot be feasibly used in low-SWaP (size, weight, and power) spiking neuromorphic hardware, since the network only works under a restrictive set of parameters. Since neuromorphic hardware elements (e.g., neuromorphic chip) typically have several constraints on features and parameter resolution and ranges, the restrictive set of parameters described by Diehl is not readily possible on neuromorphic hardware. Additionally, the network of Diehl and Cook allows only one excitatory neuron to spike per time, its application to neuromorphic hardware is limited.

Thus, a continuing need exists for a system for pattern recognition in adaptive spiking neural networks that can be easily applied to low-SWaP neuromorphic hardware with on-chip learning capability.

SUMMARY OF INVENTION

The present invention relates to a system for pattern recognition and, more particularly, to a system for pattern recognition that applied a structured network to neuromorphic hardware. The system comprises one or more processors and a non-transitory computer-readable medium having executable instructions encoded thereon such that when executed, the one or more processors perform multiple operations. The system trains a spiking neural network that is applied to neuromorphic hardware. Training the spiking neural network comprises multiple operation. The system generates, with each excitatory neuron in an excitatory layer of a spiking neural network, a spike train of neuron spikes for a plurality of training patterns, each training pattern belonging to a pattern class. A spiking rate distribution of excitatory neurons is generated for each pattern class. Each spiking rate distribution of excitatory neurons is generated, and a class template is generated for each pattern class from the normalized spiking rate distributions.

In another aspect, in generating the spiking rate distribution of excitatory neurons for each image class, the neuron spikes from all training images in the image class are summed.

In another aspect, when generating the spike trains, multiple excitatory neurons can fire at the same time.

In another aspect, in generating the spike train of neuron spikes for the plurality of training images, each input neuron in an input layer of the spiking neural network generates a spike train according to an intensity value for a corresponding feature channel, wherein the greater the intensity value, the more neuron spikes are generated.

The present invention further relates to a system that uses a trained spiking neural network applied to neuromorphic hardware to classify an unlabeled input pattern. The system classifies an unlabeled input pattern using class templates generated for a plurality of pattern classes from normalized spike rate distributions of excitatory neurons in the spiking neural network. A mechanical component of an autonomous device is controlled based on classification of the unlabeled input pattern.

In another aspect, in classifying the unlabeled input pattern, the system compares an excitatory neuron spiking rate pattern of the unlabeled input pattern with each class template and determines a match between the excitatory neuron spiking rate pattern of the unlabeled input pattern and a class template.

In another aspect, in classifying the unlabeled input pattern using the class templates, the system predicts a class label for the unlabeled input pattern from its matched class template.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 4A is a normalized spiking rate distribution of excitatory neurons for class "0" of the Modified National Institute of Standards and Technology (MNIST) database according to some embodiments of the present disclosure;

FIG. 4B is a normalized spiking rate distribution of excitatory neurons for class "1" of the MNIST database according to some embodiments of the present disclosure;

FIG. 4C is a normalized spiking rate distribution of excitatory neurons for class "2" of the MNIST database according to some embodiments of the present disclosure;

FIG. 4D is a normalized spiking rate distribution of excitatory neurons for class "3" of the MNIST database according to some embodiments of the present disclosure;

and

Figure 8:
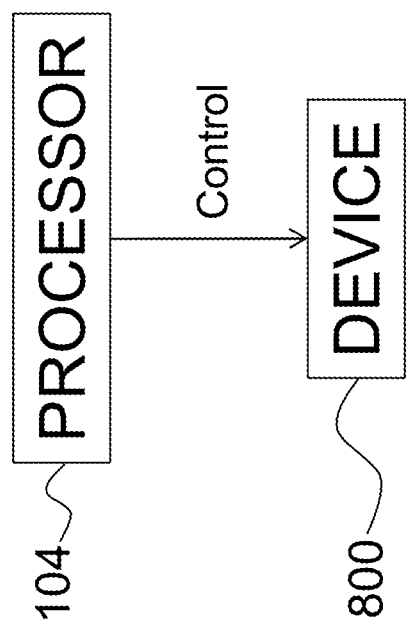

FIG. 8 is a flow diagram illustrating control of devices using the system for pattern recognition according to some embodiments of the present disclosure.

DETAILED DESCRIPTION

The present invention relates to a system for pattern recognition and, more particularly, to a system for pattern recognition that applied a structured network to neuromorphic hardware. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for pattern recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
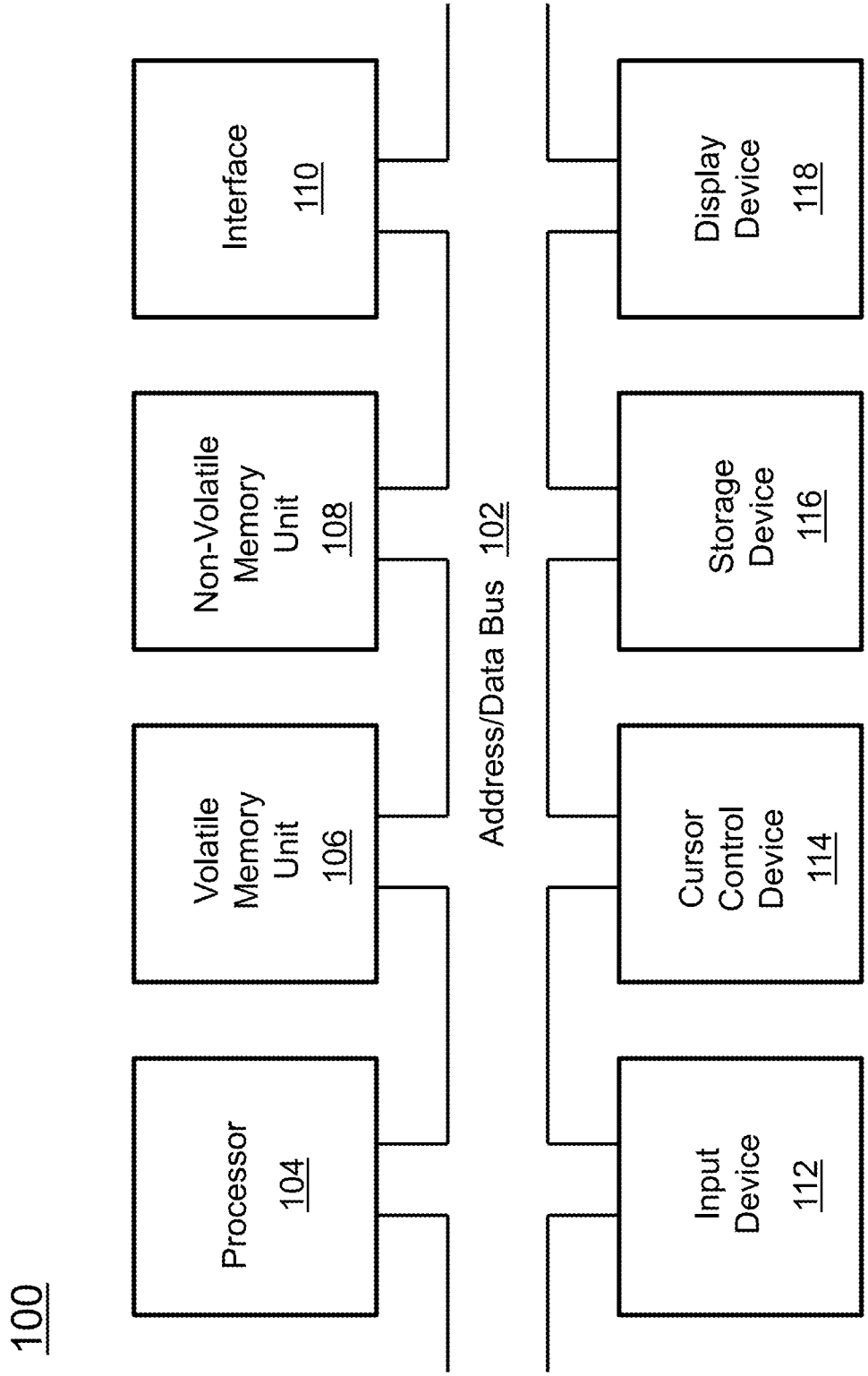
FIG. 1 is a block diagram depicting the components of a system for pattern recognition according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

The computer system 100 can be in the form of a neuromorphic computer, such as a neuromorphic chip, with online learning capability, containing electronic analog circuits to mimic neuro-biological architectures present in the nervous system. Neuromorphic generally represents analog, digital, and any other software system implementing models of neural systems. The neuromorphic may include a multiple synapses and custom boards used to interface the chip with a computer. The custom board with the neural chip may include a Field Programmable Gate Array (FPGA) to convert serial input/output external data into parallel spike data used by the neural chip and can also be used to control the neutral chip. In one embodiment, a voltage converter based in Low Dropout (LDO) chip provides power to the neural chip. An Erasable Programmable Read Only Memory (EPROM) chip may store the configuration of the neural chip. This configuration includes the topology of the neural network and other programmable parameter settings of the neurons and synapses. A universal serial bus (USB) connector may be used to load the neural network topology to be implemented by the neural chip. A serial peripheral interface (SPI) connector may be used to transmit data to a board with a microcontroller.

The board with the microcontroller may contain a microcontroller board. It is used to provide input data into the neural board and to receive data from the neural board. The microcontroller board can be connected to a PC. Level converter chips are soldered in top of the commercial microcontroller board. This is to convert voltage levels used by the microcontroller to those used by the neural board. Further, the neuromorphic computer may include oxide-based memristors, threshold switches, and transistors. Spiking neurons can pass signals of varying strength similar to neurons in human brains and can also fire when necessary rather than being controlled by central processing units (CPUs).

Figure 2:
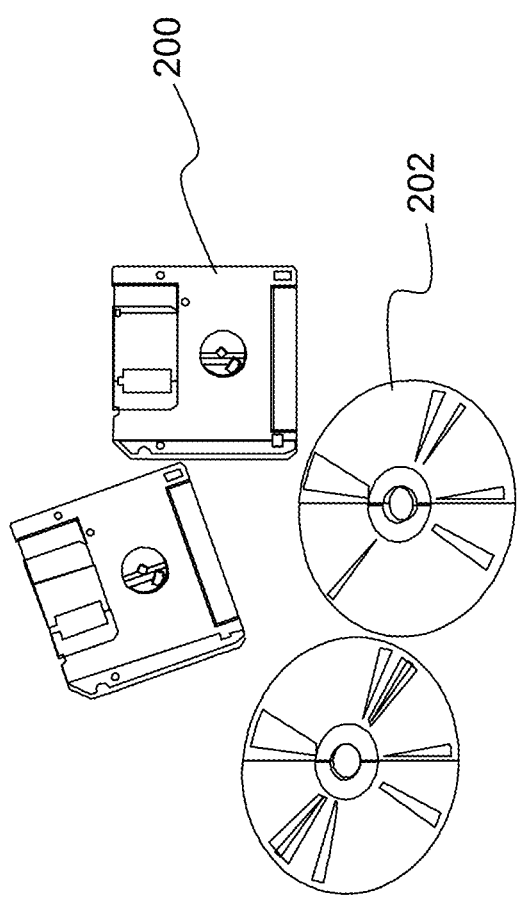
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments (2.1) Network Architecture

Figure 3:
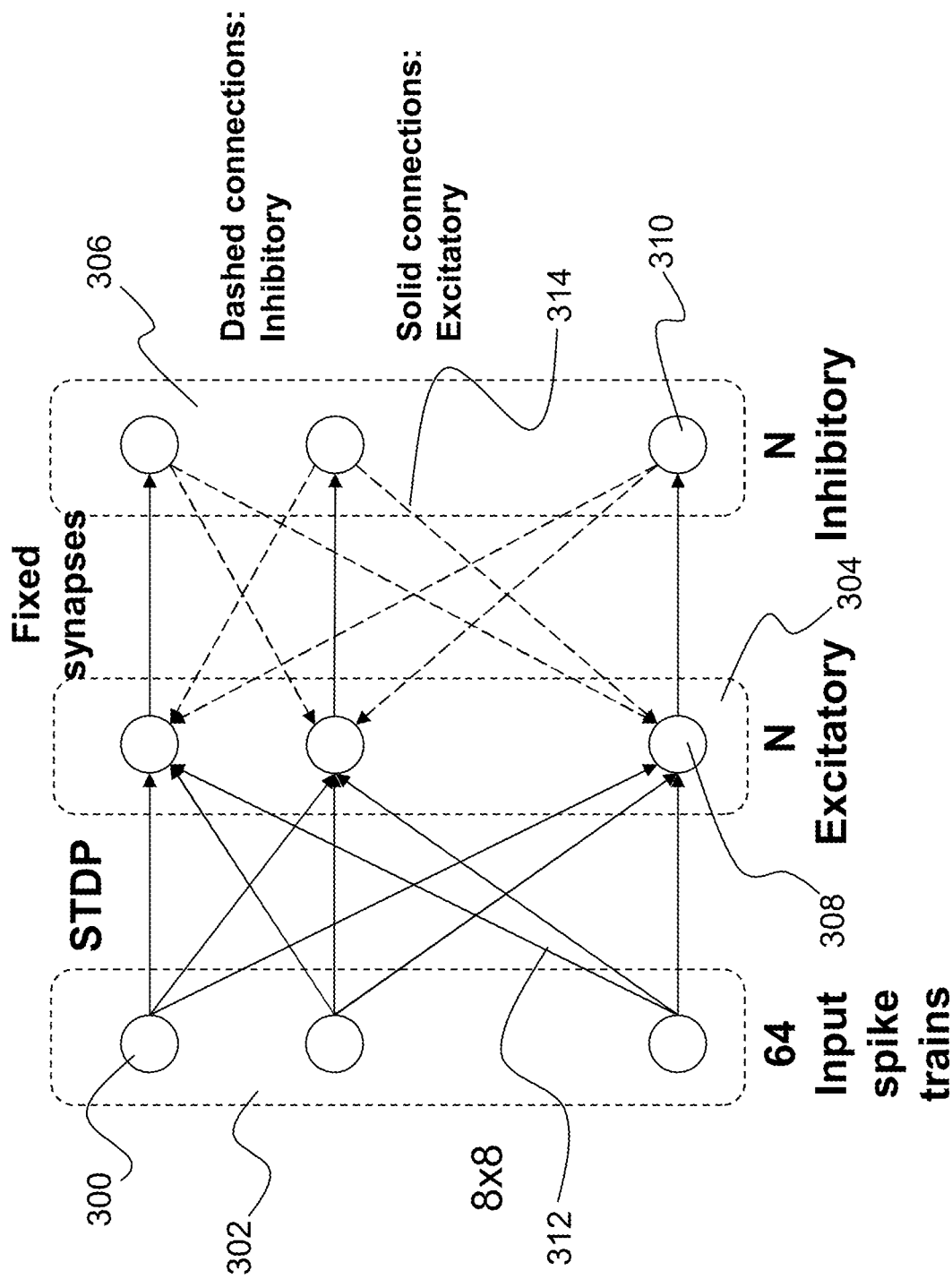
FIG. 3 is an illustration of a network architecture according to some embodiments of the present disclosure.

Described is a simple structured network that can be applied to neuromorphic chips for pattern recognition. As shown in FIG. 3, the network consists of three layers comprising a plurality of neurons represented by circles (e.g., neuron 300): an input layer 302, an excitatory layer 304, and an inhibitory neuron layer 306. The network according to embodiments of the present disclosure enables distributed learning in which multiple excitatory neurons (e.g., neuron 308) can fire at the same time. Hence, the spiking rate distribution can be used to identify unlabeled patterns, which is distinct from previous models. In training, each excitatory neuron (e.g., neuron 308) in the excitatory layer 304 generates a spike train for an input stimulus. After training, the spiking rate distribution of excitatory neurons (e.g., neuron 308) for each class can be obtained by summing the neuron spikes from all training images in that class. The spiking rate distribution can then be used to classify unlabeled inputs in the testing. In this context, class refers to high-level categories of objects encountered in the real-world for which appropriate behaviors need to be learned by autonomous agents; for example, an autonomous car needs to recognize various classes of objects such as "trucks", "school buses", "pedestrians", "bicyclists", etc.

Each neuron (e.g., neuron 300) in the input layer 302 generates a spike train according to the intensity value for the corresponding feature channel (e.g., image pixel grayscale 8-bit intensity in the range 0-255). The greater the intensity, the more spikes are generated. Each neuron (e.g., neuron 300) in the input layer 302 is connected to every neuron (e.g., neuron 308) in the excitatory neuron layer 304. The excitatory neuron layer 304 consists of N excitatory neurons (e.g., neuron 308) (hereinafter referred to as E neurons). The number N can vary. The choice of N for effective performance varies with the complexity of the pattern recognition problem (i.e., how entangled the examples belonging to various classes are in the feature space). In simulations of the system described herein, N was systematically varied from 64 to 800. The weights for the connections from the input layer 302 to the excitatory neuron layer 304 can be plastic (i.e., learn through spike timing-dependent plasticity) or fixed, but randomly initialized.

For each excitatory neuron (e.g., neuron 308), there is a corresponding inhibitory neuron (e.g., neuron 310) (hereinafter referred to as an I neuron) in the inhibitory neuron layer 306. As a result, the inhibitory neuron layer 306 has N inhibitory neurons (e.g., neuron 310). Each E neuron (e.g., neuron 308) is connected to one I neuron (e.g., neuron 310) only, while each I neuron (e.g., neuron 310) is connected to all E neurons (e.g., neuron 308) except the one that excites it. In FIG. 3, excitatory connections are denoted by solid arrowed lines 312 while inhibitory connections are denoted by dashed arrowed lines 314. The weights for both excitatory and inhibitory connections are fixed constant numbers.

(2.2) Training Phase

In the training phase, the input layer 302 generates a spike train for each feature channel based on its intensity. As a result, a subset of E neurons (e.g., neuron 308) will fire from time to time. For different types of input patterns, the E neuron (e.g., neuron 308) spiking rate patterns will be different. After the training process, the spiking rate distribution of E neurons (e.g., neuron 308) for each class can be obtained by summing the neuron spikes from all training images in that class.

FIGS. 4A-4D illustrate four non-limiting examples of spiking rate distributions of E neurons for four classes of the Modified National Institute of Standards and Technology (MNIST) database, which is a database of handwritten digits that is commonly used for training image processing systems. The spiking rate distribution can be further normalized using a suitable normalization method, such as divided by maximum, and L1 and L2 norms, which are described by Horn, R. A. and Johnson, C. R. in "Norms for Vectors and Matrices," Ch. 5 in *Matrix Analysis*, Cambridge, England: Cambridge University Press, 1990, which is hereby incorporated by reference as though fully set forth herein). In simulations of the system described herein, the L2 norm performed best. The normalized spiking rate distribution of E neurons (e.g., neuron 308) for each class is referred to as the class template.

(2.3) Operational Phase

In the operational phase, for each test pattern, the system according to embodiments of the present disclosure compares its E neuron spiking rate pattern with each class template that was generated during training. Using L2 normalization, a best match between the E neuron spiking rate pattern and a class template is found. The class label for the text pattern is then predicted from its best matched class template.

Figure 5:
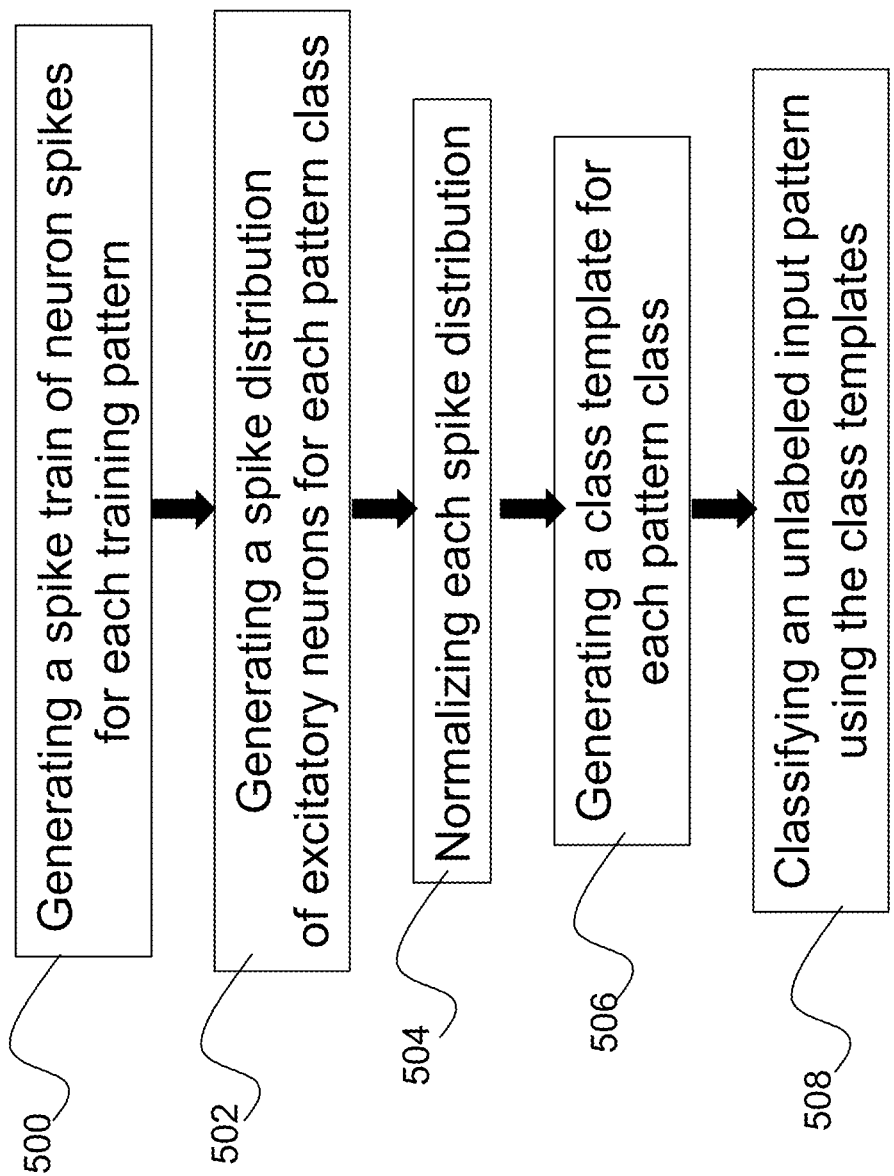
FIG. 5 is a flow diagram illustrating a system for pattern recognition according to embodiments of the present disclosure.

FIG. 5 is a flow diagram depicting operations of the system for pattern recognition according to embodiments of the present disclosure. Each of the following operations is described in detail above. In a first operation 500, a spike train of neuron spikes is generated for each training pattern. In a second operation 502, a spiking rate distribution of excitatory neurons is generated for each pattern class. Each spiking rate distribution is normalized in a third operation 504. In a fourth operation 506, a class template is generated for each pattern class. An unlabeled input pattern is classified using the class templates in a fifth operation 508.

(2.4) Experimental Studies

Figure 6:
FIG. 6 is an illustration of sample digit images in the MNIST dataset according to prior art.

The network according to embodiments of the present disclosure was tested on the MNIST dataset. FIG. 6 illustrates sample digits in the MNIST dataset. The image size in the dataset is originally 28×28 pixels. The image size in the dataset was rescaled into 8×8 pixels. As a result, the network input layer of the network described herein has 64 input neurons. The network was first trained on 10,000 images of the MNIST training dataset. After the training phase, the spiking rate distribution of E neurons for each class was generated by summing the neuron spikes from all training images in that class. The spiking rate distribution of each class is then normalized by the L2 norm method to obtain the class template. This technique was tested on all 10,000 images of the MNIST test dataset. For each test image, its E neuron spiking rate pattern was compared with each class template that was generated during the training phase. The best match is identified based on the L2 norm method, and the the class label for the test image is then predicted from its best matched class template. Various numbers N of E and I neurons (e.g., neurons 308 and 310, respectively) were used in simulations. It was found that pattern recognition performance is improved when the number N is increased.

Figure 7:
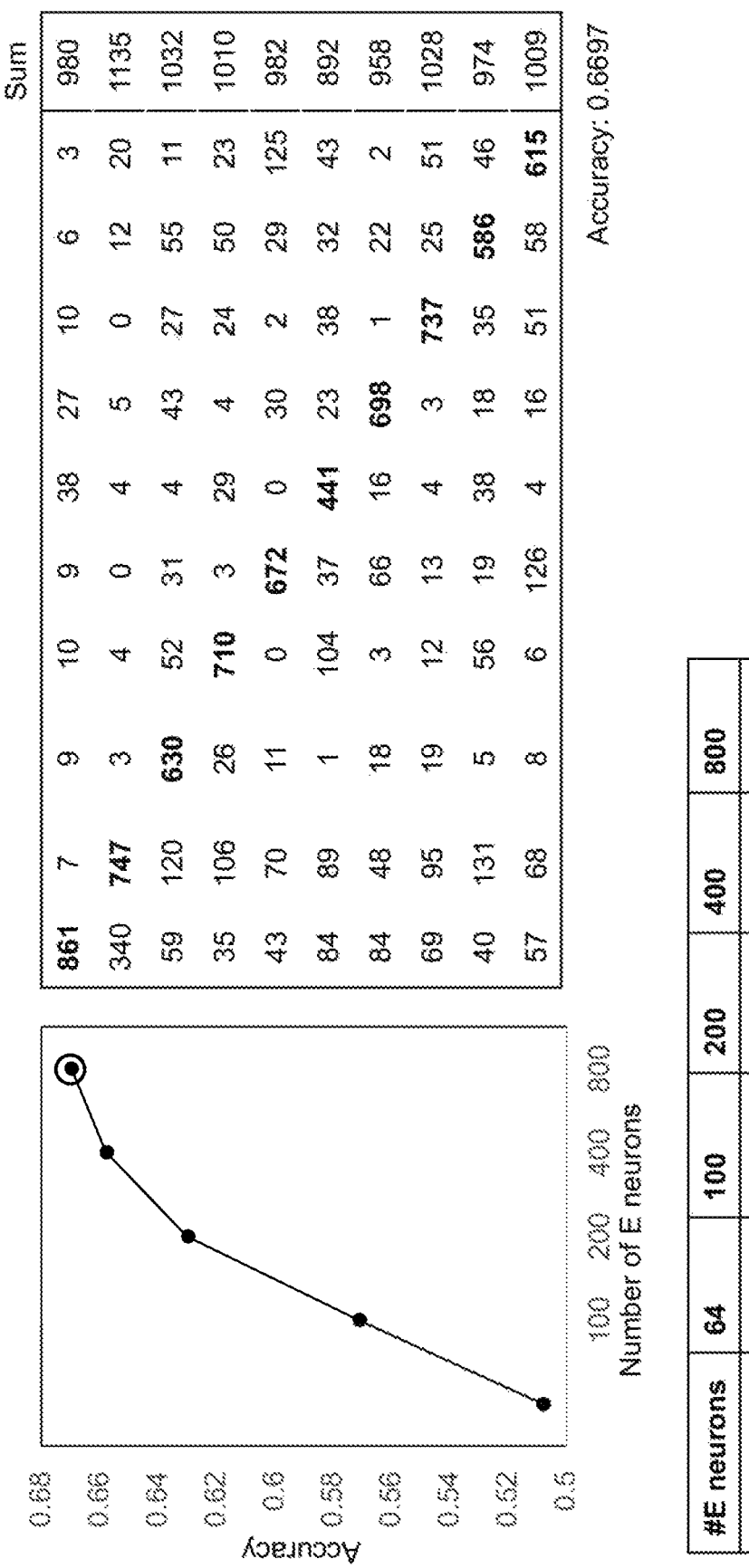
FIG. 7 is an illustration of pattern recognition accuracy results according to some embodiments of the present disclosure.

FIG. 7 depicts results showing that more neurons/synapses in the structure network according to embodiments of the present disclosure improves pattern recognition accuracy results. Specifically, the simulation results in FIG. 7 show that the accuracy of the disclosed network on the MNIST dataset improves gradually as the number N of E neurons is increased from 64 to 800. The 10×10 confusion matrix, summarizing the correct and incorrect classifications on the MNIST test dataset for each of the 10 classes, for the network with 800 E neurons is shown. The rows have counts for each class (0-9) present in the test dataset, and the columns have counts for each class (0-9) predicted by the network. The counts along the diagonal of the matrix indicate the correct classifications by the network. The additional column to the right of the matrix sums each row to indicate the total count for each class (0-9) present in the test dataset.

In summary, described herein is a method and system for distributed coding and learning in spiking neural networks for pattern recognition applications that are amenable for implementation on neuromorphic hardware. Pattern categories are represented by distributed spiking representations in neuromorphic hardware, wherein a neuron can participate in encoding multiple classes of stimuli or patterns to different degrees. A distributed neural representation for each class can be obtained by either summing the spiking responses of individual neurons through training for various examples of the given class, or by giving more weightage to recent examples using exponentially decaying functions instead of step functions. The distributed representation can also be obtained by averaging across distributions obtained from several training runs, wherein the training examples are randomly ordered from one run to the next. Suppose there are two E neurons with normalized spiking rate distributions of [1, 0.4] and [1, 0.2] from two training runs, averaging the distributions for each of the E neurons yields [1, 0.3]. Distributed spiking rate patterns for various classes can be normalized by either the maximal spiking rate or the total spiking rate across the E neurons (following training), especially when the number of examples across classes is not uniform. Suppose there are two E neurons with a spiking rate distribution of [15, 30] Hz from a given training run, then dividing by the maximal spiking rate (namely, 30 Hz) would yield a normalized spiking rate distribution of [0.5, 1], whereas dividing by the total spiking rate (namely, 45 Hz) would yield a normalized spiking rate distribution of [0.33 0.67].

As can be appreciated by one skilled in the art, the invention according to embodiments of the present disclosure can be used in any domain in which a pattern recognition task is needed. For instance, pattern recognition is used in medical science for computer-aided diagnosis systems (e.g., cancer screening), identification and authentication (e.g., fingerprint analysis, face detection and verification), target recognition systems, and various navigation and guidance systems.

FIG. 8 is a flow diagram illustrating using a processor 104 to control a mechanical component of a device 800 based on the recognized pattern. Non-limiting examples of devices 800 that can be controlled via the processor 104 include a motor vehicle. Non-limiting examples of a motor vehicle component (electrical, non-electrical, mechanical) include a brake, a steering mechanism (e.g., steering wheel, piston gear, pinion, linear gear, transverse axis of vehicle), suspension (e.g., wheels, tires, springs, shock absorbers), or safety device (e.g., airbags, seatbelt tensioners, etc.). Further, the vehicle could be an unmanned aerial vehicle (UAV), an autonomous self-driving ground vehicle, or a human operated vehicle controlled either by a driver or by a remote operator. For instance, upon object detection and recognition based using the recognized pattern, the system can cause a mechanical component of the autonomous vehicle to perform a driving operation/maneuver (such as steering or another command) in line with driving parameters in accordance with the recognized object. For example, if the system recognizes a bicyclist or another vehicle, the system described herein can cause a vehicle maneuver/operation to be performed to avoid a collision with the bicyclist or vehicle (or any other object that should be avoided while driving). The system can cause a mechanical component of the autonomous vehicle to apply a functional movement response, such as a braking operation followed by a steering operation, to redirect vehicle away from the object, thereby avoiding a collision.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular object detected and the circumstances in which the system is implemented. For instance, the method can be applied to border security (e.g., detecting smugglers at night and automatically sending an alert to border patrol personnel), intelligence, surveillance, and reconnaissance (ISR), drones (e.g., automatically directing drones to move to a specific geographical region to obtain additional data, such as images), autonomous vehicles, and perception and safety in autonomous systems (e.g., detecting humans interacting with robots in a manufacturing environment).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for pattern recognition applied to neuromorphic hardware, the system comprising:
   one or more processors and a non-transitory computer-readable medium having executable instructions encoded thereon such that when executed, the one or more processors perform an operation of:
   training a spiking neural network that is applied to neuromorphic hardware, wherein training the spiking neural network comprises operations of:
   generating, with each excitatory neuron in an excitatory layer of the spiking neural network, a spike train of neuron spikes for a plurality of training patterns, each training pattern belonging to a pattern class;
   generating a spiking rate distribution of excitatory neurons for each pattern class;
   normalizing each spiking rate distribution of excitatory neurons with a L2 norm; and
   generating a class template for each pattern class from the normalized spiking rate distributions.

2. The system as set forth in claim 1, where in generating the spiking rate distribution of excitatory neurons for each pattern class, the neuron spikes from all training patterns in a pattern class are summed.

3. The system as set forth in claim 1, wherein when generating the spike trains, multiple excitatory neurons can fire at the same time to allow for distributed coding.

4. The system as set forth in claim 1, where in generating the spike train of neuron spikes for the plurality of training patterns, each input neuron in an input layer of the spiking neural network generates a spike train according to an intensity value for a corresponding feature channel, wherein the greater the intensity value, the more neuron spikes are generated.

5. A system for pattern recognition applied to neuromorphic hardware, the system comprising:
   one or more processors and a non-transitory computer-readable medium having executable instructions encoded thereon such that when executed, the one or more processors perform operations of:
- using a trained spiking neural network applied to neuromorphic hardware to classify an unlabeled input pattern, wherein classifying the unlabeled input pattern comprises operations of:
  - using L2 normalization, classifying an unlabeled input pattern using class templates generated for a plurality of pattern classes from normalized spike rate distributions of excitatory neurons in the spiking neural network; and
  - controlling a mechanical component of an autonomous device based on classification of the unlabeled input pattern.

6. The system as set forth in claim 5, where in classifying the unlabeled input pattern, the one or more processors further perform operations of:
- comparing an excitatory neuron spiking rate pattern of the unlabeled input pattern with each class template; and
- determining a match between the excitatory neuron spiking rate pattern of the unlabeled input pattern and a class template.

7. The system as set forth in claim 6, where in classifying the unlabeled input pattern using the class templates, the one or more processors further perform an operation of predicting a class label for the unlabeled input pattern from its matched class template.

8. A computer implemented method for pattern recognition applied to neuromorphic hardware, the method comprising an act of:
- causing one or more processors to execute instructions encoded on a non-transitory computer-readable medium, such that upon execution, the one or more processors perform operations of:
  - training a spiking neural network that is applied to neuromorphic hardware, wherein training the spiking neural network comprises operations of:
    - generating, with each excitatory neuron in an excitatory layer of the spiking neural network, a spike train of neuron spikes for a plurality of training patterns, each training pattern belonging to a pattern class;
    - generating a spiking rate distribution of excitatory neurons for each pattern class;
    - normalizing each spiking rate distribution of excitatory neurons with a L2 norm; and
    - generating a class template for each pattern class from the normalized spiking rate distributions.

9. The method as set forth in claim 8, where in generating the spiking rate distribution of excitatory neurons for each pattern class, the neuron spikes from all training patterns in a pattern class are summed.

10. The method as set forth in claim 8, wherein when generating the spike trains, multiple excitatory neurons can fire at the same time.

11. The method as set forth in claim 8, where in generating the spike train of neuron spikes for the plurality of training patterns, each input neuron in an input layer of the spiking neural network generates a spike train according to an intensity value for a corresponding feature channel, wherein the greater the intensity value, the more neuron spikes are generated.

12. A computer implemented method for pattern recognition applied to neuromorphic hardware, the method comprising an act of:
- causing one or more processors to execute instructions encoded on a non-transitory computer-readable medium, such that upon execution, the one or more processors perform operations of:
  - using a trained spiking neural network applied to neuromorphic hardware to classify an unlabeled input pattern, wherein classifying the unlabeled input pattern comprises operations of:
    - using L2 normalization, classifying an unlabeled input pattern using class templates generated for a plurality of pattern classes from normalized spike rate distributions of excitatory neurons in the spiking neural network; and
    - controlling a mechanical component of an autonomous device based on classification of the unlabeled input pattern.

13. The method as set forth in claim 12, where in classifying the unlabeled input pattern, the one or more processors further perform operations of:
- comparing an excitatory neuron spiking rate pattern of the unlabeled input pattern with each class template; and
- determining a match between the excitatory neuron spiking rate pattern of the unlabeled input pattern and a class template.

14. The method as set forth in claim 13, where in classifying the unlabeled input pattern using the class templates, the one or more processors further perform an operation of predicting a class label for the unlabeled input pattern from its matched class template.

15. A computer program product for pattern recognition applied to neuromorphic hardware, the computer program product comprising:
- computer-readable instructions stored on a non-transitory computer-readable medium that are executable by a computer having one or more processors for causing the processor to perform operations of:
  - training a spiking neural network that is applied to neuromorphic hardware, wherein training the spiking neural network comprises operations of:
    - generating, with each excitatory neuron in an excitatory layer of the spiking neural network, a spike train of neuron spikes for a plurality of training patterns, each training pattern belonging to a pattern class;
    - generating a spiking rate distribution of excitatory neurons for each pattern class;
    - normalizing each spiking rate distribution of excitatory neurons with a L2 norm; and
    - generating a class template for each pattern class from the normalized spiking rate distributions.

16. The computer program product as set forth in claim 15, where in generating the spiking rate distribution of excitatory neurons for each pattern class, the neuron spikes from all training patterns in a pattern class are summed.

17. The computer program product as set forth in claim 15, wherein when generating the spike trains, multiple excitatory neurons can fire at the same time.

18. The computer program product as set forth in claim 15, where in generating the spike train of neuron spikes for the plurality of training patterns, each input neuron in an input layer of the spiking neural network generates a spike train according to an intensity value for a corresponding feature channel, wherein the greater the intensity value, the more neuron spikes are generated.

19. A computer program product for pattern recognition applied to neuromorphic hardware, the computer program product comprising:
- computer-readable instructions stored on a non-transitory computer-readable medium that are executable by a computer having one or more processors for causing the processor to perform operations of:

using a trained spiking neural network applied to neuromorphic hardware to classify an unlabeled input pattern, wherein classifying the unlabeled input pattern comprises operations of:

using L2 normalization, classifying an unlabeled input pattern using class templates generated for a plurality of pattern classes from normalized spike rate distributions of excitatory neurons in the spiking neural network; and controlling a mechanical component of an autonomous device based on classification of the unlabeled input pattern.

20. The computer program product as set forth in claim 19, where in classifying the unlabeled input pattern, the one or more processors further perform operations of:

comparing an excitatory neuron spiking rate pattern of the unlabeled input pattern with each class template; and determining a match between the excitatory neuron spiking rate pattern of the unlabeled input pattern and a class template.

21. The computer program product as set forth in claim 20, where in classifying the unlabeled input pattern using the class templates, the one or more processors further perform an operation of predicting a class label for the unlabeled input pattern from its matched class template.

* * * * *